Patented Nov. 8, 1938

2,135,978

UNITED STATES PATENT OFFICE 2,135,978

SULPHONATED ALKYLATED DIPHENYL COMPOUNDS AND SALTS THEREOF

George L. Magoun, Nitro, W. Va., assignor, by mesne assignments, to Monsanto Chemical Company, St. Louis, Mo., a corporation of Delaware No Drawing. Application May 18, 1935,
Serial No. 22,266

13 Claims. (Cl. 260—512)

The present invention relates to the preparation of new compounds which possess wetting, cleansing and penetrating properties and which are particularly adapted for use in the textile, leather, rubber and related industries.

It has already been proposed to react a hydroxy substituted diphenyl with an aliphatic alcohol and sulphonate the product so obtained in a manner and employing such quantities of materials that a mono alkylated mono sulphonated hydroxy diphenyl is obtained.

According to the present invention it has been discovered that on reacting a diphenyl compound, for example ortho hydroxy diphenyl with an aliphatic alcohol or other alkylating agent and a sulphonating agent, for example, oleum in such quantities and under suitable conditions so that a polyalkylated and poly-sulphonated diphenyl compound results, said material has marked improvement in wetting, penetrating and like properties over a hydroxy diphenyl possessing a smaller number of alkyl and sulphonic groups. The properties of the new sulphonic acid substances obtained, i. e. of the free sulphonic acids and their water-soluble chemical combinations or salts with alkalies, such as alkali metals, ammonia and the like, exhibit, as compared with those already known, a substantial increased efficiency, and to a degree that could not have been anticipated.

Substances particularly adapted for the production of the new compounds of the present invention comprise diphenyl and its derivatives, as for example ortho hydroxy diphenyl, para hydroxy diphenyl, ortho chlor diphenyl, para chlor diphenyl and analogues and equivalents thereof. As alkylating agents, the various aliphatic alcohols as for example primary, secondary or tertiary butyl alcohols with straight or branched chain such as n-butyl alcohol, methyl ethyl carbinol, tri methyl carbinol, n-amyl alcohol, isoamyl alcohol, ethyl alcohol, octyl alcohol and the like may be brought into action on the initial material and they may be employed as such or in the form of their esters, such as the alkyl sulphates. In the sulphonation process it is preferred that fuming sulphuric acid be employed, although if convenient or desirable other sulphonating agents may be employed.

The following examples are to be understood as being specific embodiments of the invention and not limitation of the scope of the invention. Any of the above described diphenyl compounds and alkylating agents may be employed in the preparation of the compounds of the present invention. Furthermore, the present invention is not limited to the alkali metal salts of the new class of compounds but includes salts in general as well as the free acids.

400 parts by weight of n-butyl alcohol and 288 parts by weight of ortho hydroxy diphenyl are placed in a suitable reactor equipped with a reflux condenser, thermometer and agitator, and cooled to substantially 10° to 15° C., whereupon 880 parts by weight of fuming sulphuric acid containing 21% sulphur trioxide are then added at a temperature below 20° C. If desired a larger quantity of fuming sulphuric acid containing a smaller percentage, for example 10 and 15%, of sulphur trioxide may be employed. After allowing to stand for a short time, the temperature is increased to substantially 70° C., and maintained thereat for a convenient period of time, for example four to eight hours, after which time the spent sulphuric acid is drawn off. The upper layer containing the free acid of the polyalkylated and polysulphonated ortho hydroxy diphenyl may be treated in a convenient manner for the conversion to the alkali metal salt thereof. One such method employed comprises the addition of ethyl alcohol to the free acid layer and the addition of sufficient caustic soda to said acid-alcohol solution to neutralize it to litmus. After neutralization is effected, the product is cooled, the sodium sulphate filtered off, and the sodium salt of the polybutylated, polysulphonated ortho hydroxy diphenyl concentrated, as for example by evaporation, to produce a slightly yellow colored solid. Investigation showed the product prepared as described to contain two butyl groups and two sulphonic groups.

If convenient or desirable the free sulphonic acid layer as described above may be treated with lime to convert any free sulphuric acid to calcium sulphate and to convert the sulphonic derivative of the alkylated ortho hydroxy diphenyl to the calcium salt. After filtering off the calcium sulphate formed by the liming treatment described, sufficient sodium carbonate is added to the filtrate to convert the calcium salt to the sodium salt, whereupon after filtering off the insoluble calcium carbonate, the filtrate comprising an aqueous solution of the sodium salt of the dibutylated disulphonated ortho hydroxy diphenyl may be concentrated or dried in a well known manner.

Wetting tests carried out employing small proportions of the dibutylated disulphonated ortho hydroxy diphenyl showed it to be from two to three times as fast in wetting as the mono butylated mono sulphonated ortho hydroxy diphenyl.

As a further example of the new class of chemical compounds diphenyl has been reacted with an alkylating agent, for example butyl alcohol and sulphonated to give a polyalkylated, polysulphonated diphenyl. As one method of preparation thereof 50 parts by weight of diphenyl and 100 parts by weight of butyl alcohol were placed in a suitable reactor and cooled to substantially 5 to 10° C. after which 300 parts by weight of fuming sulphuric acid containing 25% of sulphur trioxide were added slowly thereto at a temperature of substantially 5 to 10° C. after which the temperature was raised to substantially 50° C. and maintained thereat for 10 to 15 hours. After separating the spent sulphuric acid layer, an additional 240 parts by weight of 97–98% sulphuric acid were added to the sulphonic acid layer and sulphonation continued. On isolating the polyalkylated, polysulphonated diphenyl in the manner set forth above, it was found that a dibutylated, disulphonated diphenyl had been obtained.

The present invention is limited solely by the following claims.

I claim:

1. A member of the group consisting of polyalkylated polysulfonated hydroxy diphenyl and alkali metal, ammonium and alkaline earth metal salts of said sulfonic acid.

2. A member of the group consisting of dialkylated disulfonated hydroxy diphenyl and alkali metal, ammonium and alkaline earth metal salts of said sulfonic acid.

3. An alkali metal salt of a dialkylated, disulphonated hydroxy diphenyl.

4. The sodium salt of a dibutylated, disulphonated hydroxy diphenyl.

5. The sodium salt of dibutylated, disulphonated ortho hydroxy diphenyl.

6. The process of preparing a polyalkylated, polysulphonated diphenyl compound which comprises treating substantially one molecular proportion of an aromatic compound containing a diphenyl nucleus, the nuclear hydrogen atoms of which where substituted are replaced by a member of the group consisting of the hydroxyl group and halogen atoms, with an excess over two molecular proportions of an aliphatic alcohol and an excess of fuming sulphuric acid over that required to theoretically produce two sulphonic acid groups at a temperature below 20° C., raising the temperature to complete the sulphonation and isolating the polyalkylated, polysulphonated diphenyl compound.

7. The process of preparing a polyalkylated, polysulphonated hydroxy diphenyl which comprises treating substantially one molecular proportion of a hydroxy diphenyl with an excess over two molecular proportions of an aliphatic alcohol and an excess of fuming sulphuric acid over that required to theoretically produce two sulphonic groups at a temperature below 20° C., raising the temperature to complete the sulphonation and isolating the polyalkylated, polysulphonated hydroxy diphenyl compound.

8. The process of preparing a dibutylated, disulphonated diphenyl compound, which comprises treating substantially one molecular proportion of an aromatic compound containing a diphenyl nucleus, the nuclear hydrogen atoms of which where substituted are replaced by a member of a group consisting of the hydroxyl group and halogen atoms, with an excess over two molecular proportions of butyl alcohol, and an excess of fuming sulphuric acid over that required to theoretically produce two sulphonic groups at a temperature below 20° C., raising the temperature to complete the sulphonation and isolating the dibutylated, disulphonated compound.

9. The process of preparing a dibutylated, disulphonated hydroxy diphenyl compound, which comprises treating substantially one molecular proportion of a hydroxy diphenyl with an excess over two molecular proportions of butyl alcohol, and an excess of fuming sulphuric acid over that required to theoretically produce two sulphonic groups at a temperature below 20° C., raising the temperature to complete the sulphonation and isolating the dibutylated, disulphonated hydroxy diphenyl.

10. The process of preparing a dibutylated, disulphonated ortho hydroxy diphenyl which comprises treating substantially one molecular proportion of ortho hydroxy diphenyl with an excess over two molecular proportions of n-butyl alcohol and an excess of fuming sulphuric acid, containing substantially 21% sulphur trioxide, over that required to theoretically produce two sulphonic groups at a temperature of substantially 10° to 20° C., raising the temperature to substantially 70° C. to complete the sulphonation and isolating the dibutylated, disulphonated ortho hydroxy diphenyl as the sodium salt.

11. A polyalkylated, polysulphonated aromatic compound containing a diphenyl nucleus, the nuclear hydrogen atoms of which where otherwise substituted are replaced by a member of a group consisting of the hydroxyl group and halogen atoms, said alkyl group containing more than one carbon atom.

12. A member of the group consisting of polybutylated, polysulphonated aromatic compounds containing a diphenyl nucleus, the nuclear hydrogen atoms of which where otherwise substituted are replaced by a member of a group consisting of the hydroxyl group and halogen atoms, and alkali metal, ammonium and alkaline earth metal salts of said sulphonic acid.

13. An alkali metal salt of a polyalkylated, polysulphonated aromatic compound containing a diphenyl nucleus, the nuclear hydrogen atoms of which where otherwise substituted are replaced by a member of the group consisting of the hydroxyl group and halogen atoms, said alkyl group containing more than one carbon atom.

GEORGE L. MAGOUN.